(12) United States Patent
Choi et al.

(10) Patent No.: US 11,307,064 B2
(45) Date of Patent: Apr. 19, 2022

(54) APPARATUS AND METHOD FOR PROCESSING MULTI-TYPE SENSOR SIGNAL ON THE BASIS OF MULTI-MODAL DEEP LEARNING

(71) Applicant: Industry-Academic Cooperation Foundation, Dankook University, Yongin-si (KR)

(72) Inventors: Sang-Il Choi, Seoul (KR); Haanju Yoo, Seoul (KR)

(73) Assignee: Industry-Academic Cooperation Foundation, Dankook University, Yongin-si (KR)

( * ) Notice: Subject to any disclaimer, the term of this patent is extended or adjusted under 35 U.S.C. 154(b) by 426 days.

(21) Appl. No.: 16/180,492

(22) Filed: Nov. 5, 2018

(65) Prior Publication Data
US 2019/0293462 A1 Sep. 26, 2019

(30) Foreign Application Priority Data
Mar. 23, 2018 (KR) .......................... 10-2018-0034022

(51) Int. Cl.
*G01D 18/00* (2006.01)
*G06N 3/08* (2006.01)

(52) U.S. Cl.
CPC .............. *G01D 18/00* (2013.01); *G06N 3/08* (2013.01)

(58) Field of Classification Search
CPC .................................. G01D 18/00; G06N 3/08
(Continued)

(56) References Cited

U.S. PATENT DOCUMENTS

| 9,586,314 B2 * | 3/2017 | Bruemmer | G01C 21/34 |
| 2015/0164389 A1 * | 6/2015 | Varsavsky | G01N 21/59 |
| | | | 600/316 |

FOREIGN PATENT DOCUMENTS

| KR | 10-2015-0011620 A | 2/2015 |
| KR | 10-2017-0068059 A | 6/2017 |
| KR | 10-2017-0116305 A | 10/2017 |

OTHER PUBLICATIONS

Z. Liu, W. Zhang, S. Lin and T. Q. S. Quek, "Heterogeneous Sensor Data Fusion By Deep Multimodal Encoding," in IEEE Journal of Selected Topics in Signal Processing, vol. 11, No. 3, pp. 479-491, Apr. 2017, doi: 0.1109/JSTSP.2017.2679538. (Year: 2017).*

(Continued)

*Primary Examiner* — Catherine T. Rastovski
*Assistant Examiner* — Aeysha N Sultana
(74) *Attorney, Agent, or Firm* — Paratus Law Group, PLLC

(57) ABSTRACT

An apparatus for processing multi-type sensor signals on the basis of multi-modal deep learning, the apparatus including: an individual sensor failure diagnosis unit configured to measure a normality of a sensor output of a single modal sensor at each sampling period, and sense an abnormal operation of the sensor on the basis of the measured normality; an inter-sensor mutual failure diagnosis unit including a multi-modal deep auto encoder, and configured to learn a correlation existing between multi-modalities, extract shared representation between modalities from multi-modal inputs on the basis of the learned correlation, and perform an inter-sensor mutual failure diagnosis; and a reconstruction target sensor output value reconstructing unit configured to, when an output value of a specific sensor is missing, predict (Continued)

and reconstruct the output value of the sensor using other sensor information using the shared representation extracted from other modal sensors.

10 Claims, 4 Drawing Sheets

(58) Field of Classification Search
USPC .......................................................... 702/183
See application file for complete search history.

(56) References Cited

OTHER PUBLICATIONS

A. Creswell, T. White, V. Dumoulin, K. Arulkumaran, B. Sengupta and A. A. Bharath, "Generative Adversarial Networks: An Overview," in IEEE Signal Processing Magazine, vol. 35, No. 1, pp. 53-65, Jan. 2018, doi: 10.1109/MSP.2017.2765202. (Year: 2018).*
Cadena, Cesar, Anthony R. Dick, and Ian D. Reid. "Multi-modal Auto-Encoders as Joint Estimators for Robotics Scene Understanding." Robotics: Science and Systems. vol. 5. 2016. (Year: 2016).*
N. Jaques, S. Taylor, A. Sano and R. Picard, "Multimodal autoencoder: A deep learning approach to filling in missing sensor data and enabling better mood prediction," 2017 Seventh International Conference on Affective Computing and Intelligent Interaction ( ACII), San Antonio, TX, 2017, (Year: 2017).*

* cited by examiner

APPARATUS AND METHOD FOR PROCESSING MULTI-TYPE SENSOR SIGNAL ON THE BASIS OF MULTI-MODAL DEEP LEARNING

CROSS-REFERENCE TO PRIOR APPLICATION

This application claims priority to Korean Patent Application No. 10-2018-0034022 filed on Mar. 23, 2018, which is hereby incorporated by reference in its entirety.

BACKGROUND

1. Technical Field

The present invention relates to multi-type sensor signal processing, and specifically, to an apparatus and method for processing multi-type sensor signals on the basis of multi-modal deep learning, in which an operation reliability of a specific sensor is estimated on the basis of inputs of other modal sensors using a multi-modal deep learning auto encoder, and a normal output of an abnormal operation sensor is reconstructed on the basis of extracted shared representation.

2. Related Art

Recently, various advanced driver assistance systems (ADAS) have been developed and used for convenience and safety of drivers.

For example, various systems are being applied to vehicles, such as smart cruise control (SCC) that is designed to automatically adjust the vehicle speed while maintaining a predetermined distance by recognizing a vehicle ahead of the vehicle, lane keeping assist system (LKAS) that is designed to, at a time of a driver's unintentional lane departure unless a turn signal is turned on, assist the vehicle in returning to the lane by controlling steering, and smart parking assist system (SPAS) that is designed to recognize a parking space and perform parking on behalf of a driver, and the use of the systems is increasing with more and more applications and functions.

These systems are equipped with various sensors, such as radars, Lidars, cameras, and ultrasonic sensors, and the like, that recognize a driving environment of a driver and assist the driver according to the driving situation, providing functions that serve as the eyes of a driver.

ADAS performs auxiliary control in regard to acceleration/deceleration or steering of the vehicle on the basis of information about various surrounding environments such as the distance and speed acquired through sensors.

ADAS needs to have a function for determining a failure of a sensor in real time and correcting the error.

In the ADAS, a sensor serves as the only channel for recognizing the external environment. When a sensor and a sensing information transport system have an error, serious defects may be inevitable for the ADAS system.

In addition, as for the ADAS developing toward autonomous navigation system, the use of various and a large number of sensors is inevitable. To this end, an automated algorithm that can effectively verify a large quantity of sensor data is needed.

In addition, in many cases, even when an abnormal operation of the sensor is detected, the operation may be not immediately stopped depending on the driving situation.

In addition, with the development of technology, it is important to increase the capability of a vehicle to be movable for repairs in anticipation of an increasing number of vehicle users who are unskilled at manual driving.

Especially, there is a need for technology development for mutual verification between sensors.

It is substantially difficult and inefficient to secure all verification cases that need to be considered with respect to various sensor operating environments, such as the region, the time, and the weather.

In many cases, sensors have recognition areas overlapping each other, and unless recognition areas overlap, there are many factors exerting a common influence on sensors, such as weather and illumination information.

Since a number of sensors are not likely to fail at the same time except for a case of large scale damage, there is a need to introduce a method for mutual verification through information shared between sensors such that more efficient and comprehensive sensor verification is provided.

In particular, there is a need to develop a new technology capable of reconstructing a normal output of an abnormal operation sensor.

RELATED ART DOCUMENT

Patent Document

Korean Laid-open Patent Publication No. 10-2017-0068059
Korean Laid-open Patent Publication No. 10-2015-0011620
Korean Laid-open Patent Publication No. 10-2017-0116305

SUMMARY

The present invention is directed to providing an apparatus and method for processing multi-type sensor signals capable of diagnosing a failure of an individual sensor of a specific single modality by detecting a sensor abnormality through an algorithm using deep learning.

The present invention is directed to providing an apparatus and method for processing multi-type sensor signals capable of, in the case of multi-modal sensors, design a deep learning network for extracting shared representation between sensors using multi-modality.

The present invention is directed to providing an apparatus and method for processing multi-type sensor signals capable of estimating the reliability of an operation of a specific sensor on the basis of inputs of other modal sensors using a multi-modal deep layer auto encoder, and reconstructing a normal output of an abnormal operation sensor on the basis of extracted shared representation.

The present invention is directed to providing an apparatus and method for processing multi-type sensor signals capable of enhancing the efficiency in detecting an abnormal operation of multi-modal sensors by allowing a complex correlation between modalities to be automatically trained through a large quantity of training data using pieces of data simultaneously acquired with respect to the same environment using different types of sensors.

The technical objectives of the present invention are not limited to the above, and other objectives may become apparent to those of ordinary skill in the art based on the following descriptions.

According to one aspect of the present invention, there is provided an apparatus for processing multi-type sensor signals on the basis of multi-modal deep learning, the apparatus including: an individual sensor failure diagnosis unit configured to measure a normality of a sensor output of a single modal sensor at each sampling period, and sense an abnormal operation of the sensor on the basis of the measured normality; an inter-sensor mutual failure diagnosis unit including a multi-modal deep auto encoder, and configured to learn a correlation existing between multi-modalities, extract shared representation between modalities from multi-modal inputs on the basis of the learned correlation, and perform an inter-sensor mutual failure diagnosis; and a reconstruction target sensor output value reconstructing unit configured to, when an output value of a specific sensor is missing, predict and reconstruct the output value of the sensor using other sensor information using the shared representation extracted from other modal sensors.

The individual sensor failure diagnosis unit may include: an information compressor configured to compress output information of individual sensors; a dynamic information reliability meter configured to derive a value that is expected to form compressed data of a current point in time from compressed data of a previous point in time using a dynamic aspect that is modeled through training data; an individual input reliability meter configured to calculate a reliability of a sensor output at a specified point of time in view of normality and abnormality; and a final reliability meter configured to calculate a final reliability using a linear regression analyzer on the basis of reliability weights for a reconstructed data distribution and a compressed data distribution.

The individual input reliability meter may be configured to, in order to calculate reliability of a sensor output $X_t$ at a specified point of time t in view of normality and abnormality: obtain compressed data $Z_t$ by applying $X_t$ to a variational auto-encoder (VAE), obtain reconstructed data $\hat{X}_t$ of the input from the compressed data $Z_t$, measure the extent of how close the compressed data $Z_t$ is to pieces of compressed data extracted from the training data in a compression space in order for the compressed data $Z_t$; and measure a value $\|\hat{X}_t - X_t\|$ and reflect the value $\|\hat{X}_t - X_t\|$ on the reliability calculation in order for the reconstructed data $\hat{X}_t$.

The individual input reliability meter may calculate the individual input reliability as $c_S(t) = \lambda_r \times \|\hat{X}_t - X_t\|_2 + \lambda_z \times |Z_t|_1$, wherein $\lambda_r$ and $\lambda_t$ may denote a reliability weight on a reconstructed data distribution and a reliability weight on a compressed data distribution, respectively.

The dynamic information reliability meter may derive a value $\hat{Z}_t$ that is expected to form compressed data of a current point in time from compressed data $Z_{t-1}$ of a previous point in time using a dynamic aspect that is modeled through training data, wherein a dynamic information reliability $c_d(t)$ is obtained as:

$$c_d(t) = \|\hat{X}_t - Z_t\|_2.$$

The multi-modal deep auto encoder may have a structure in which shared representation is extracted from data of three types of modalities, the structure including: an encoder configured to perform independent abstraction processes on the pieces of input data $X_A$, $X_B$, and $X_C$ of the respective modalities and extract shared representation $Z_{ABC}$ from the pieces of input data $X_A$, $X_B$, and $X_C$ subjected to the independent abstraction processes; and a decoder configured to generate reconstructions of $\hat{X}_A$, $\hat{X}_B$, and $\hat{X}_C$ for the pieces of input data through the extracted shared representation.

For mutual verification between multi-type sensors using multi-modality, the multi-modal deep auto encoder may be trained such that an objective function L is optimized on the basis of N pieces of training data $\{(X_{A_i}, X_{B_i}, X_{C_i}|i=1, \ldots, N\}$:

$$L(X_{A_i}, X_{B_i}, X_{C_i}; \theta) = \operatorname{argmin}_\theta \sum_{k \in A,B,C} \|D(E(X_{k_i}; \theta); \theta) - X_{k_i}\|_2,$$

wherein $\theta$ denotes a parameter of a network, and $\mathcal{L}$ and E denote an output of the decoder and an output of the encoder, respectively.

When a sensor desired to be verified is A and sensors used for the verification are B and C, shared representation $Z_{BC}$ may be extracted from the sensors B and C using the multi-modal deep auto encoder, and a result of compressing data $Z_A$ of the sensor A to be verified is input to a multi-layer perceptron.

The reconstruction target sensor output value reconstructing unit may employ: a generative adversarial network (GAN) deep learning model including a generator network G configured to generate new virtual data and a discriminator network $\mathcal{L}$ configured to distinguish the generated data from actual data, to perform learning on the basis of a competitive relation in which the generator network G and the discriminator network $\mathcal{L}$ derive results that are complementary to each other.

When pieces of actually acquired data follow a probability distribution $P_{data}$, and virtual data generated by the generator network G using a low dimensional noise z sampled from a probability distribution $P_z$ as an input is G(z), in the learning process, the GAN may optimize an objective function $$\min_G \max_D V(D, G) = E_{x \sim P_{data}(x)}[\log D(x)] + E_{z \sim P_z(z)}[\log(1 - D(G(z)))],$$

wherein the generator network G may be trained such that data generated by the generator network G is determined to be actual data by the discriminator network $\mathcal{L}$, and the discriminator network $\mathcal{L}$ may be trained such that data generated by the generator network G is filtered from the actual data.

According to another aspect of the present invention, there is provided a method for processing multi-type sensor signals to perform a sensor failure diagnosis and a reconstruction in a multi-modal sensor network combined with multi-type sensors, the method including: measuring a normality of a sensor output of a single modal sensor at each sampling period, and sensing an abnormal operation of the sensor on the basis of the measured normality; learning a correlation existing between multi-modalities, extracting shared representation between modalities from multi-modal inputs on the basis of the learned correlation, and performing an inter-sensor mutual failure diagnosis; and when an output value of a specific sensor is missing, predicting and reconstructing the output value of the sensor using other sensor information using the shared representation extracted from other modal sensors.

The method may further include, in order to reconstruct an output value of a reconstruction target sensor, employing a GAN deep learning model including a generator network G configured to generate new virtual data and a discriminator network $\mathcal{L}$ configured to distinguish the generated data from actual data, to perform learning on the basis of a competitive relation in which the generator network and the discriminator network derive results that are complementary to each other.

BRIEF DESCRIPTION OF THE DRAWINGS

Example embodiments of the present invention will become more apparent by describing example embodiments of the present invention in detail with reference to the accompanying drawings, in which.

DETAILED DESCRIPTION

Hereinafter, exemplary embodiments of an apparatus and method for processing multi-type sensor signals on the basis of multi-modal deep learning according to the present invention will be described in detail.

The features and advantages of an apparatus and method for processing multi-type sensor signals on the basis of multi-modal deep learning according to the present invention will become more apparent by describing exemplary embodiments thereof in detail.

Figure 1:
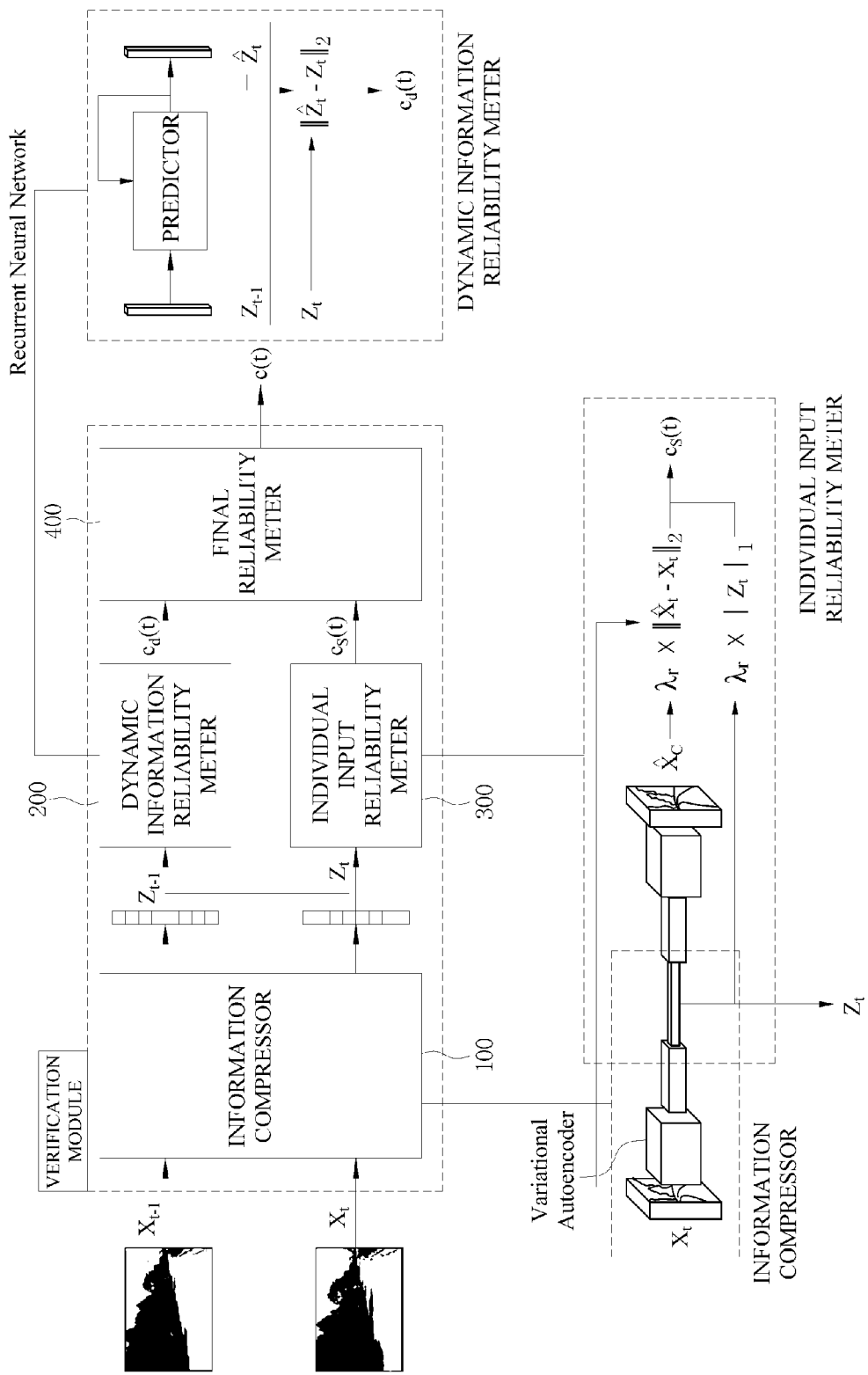
FIG. 1 is a block diagram illustrating an apparatus for verifying a single modal individual sensor according to the present invention.

FIG. 1 is a block diagram illustrating an apparatus for verifying a single modal individual sensor according to the present invention.

An apparatus and method for processing multi-type sensor signals on the basis of multi-modal deep learning according to the present invention are provided to estimate the reliability of an operation of a specific sensor on the basis of inputs of other modal sensors using a multi-modal deep auto encoder and reconstruct a normal output of an abnormal operation sensor on the basis of extracted shared representation.

To this end, the present invention may include a construction for detecting an abnormality of a sensor through an algorithm using deep learning, a construction for diagnosing a failure of an individual sensor of a specific single modality, and a construction for designing a deep learning network that extracts shared representation shared between sensors using multi-modality.

Information about a target (an object) may be collected in various forms such as an image, sound, and the like. The type of such data is referred to as a mode, and various modes of signals (data) may be acquired according to the type of a sensor that detects an object.

Recently, deep learning has been actively studied, but the researches have been focused only on development of algorithms that can robustly handle single-mode signals, such as a signal in a spatial mode and a signal in a temporal mode, even in various environments and variations.

An apparatus and method for processing multi-type sensor signal on the basis of multi-modal deep learning according to the present invention includes a construction for a new type of deep learning capable of extracting shared representation from multi-modal data acquired from different sensors with respect to one object, and a construction for performing mutual verification on an abnormality of sensor signals of the different sensors on the basis of the shared representation extracted through a multi-modal deep learning network.

In particular, the apparatus and method includes a construction for multi-type sensor signal verification and reconstruction on the basis of multi-modal deep learning, in which a signal of an abnormal sensor is reconstructed using shared representation.

Modality refers to an independent single channel of a sensor.

A sensor network may be classified into a single modal sensor network and a multi-modal sensor network depending on the sensor channel (type) of data being used in the network.

For example, a sensor only using visual information in a visible light band (e.g., an RGB camera) corresponds to a single-modal sensor network, and a sensor used together with other sensors based on various channels for a sense of touch and a sense of smell as well as a sense of sight may correspond to a multi-modal sensor network.

However, even for the same type of sensor, when obtained data exhibits a different characteristic depending on a sensing area of the sensor, the sensor may be referred to as having multi-modalities.

First, the following description is made in relation to an individual sensor signal diagnosis using a recurrent neural network (RNN) and a variational auto-encoder (VAE).

A deep auto encoder is a network that allows more efficient information compression using statistical characteristics of input data.

Of the deep auto encoder, the VAE refers to a network that maps input data, having been used for learning, to a low dimensional feature space, and provides a basis for allowing the extent of normality of specific input data to be determined on the basis of a learned compressed result.

The present invention measures the normality of a sensor output at each sampling period with respect to a single modal sensor using the above described characteristics of the VAE, and detects an abnormal operation of the sensor.

In addition, the present invention models a dynamic aspect of a sensor output by adopting an RNN that is specialized in modeling dynamic characteristics of time series data, and allows an abnormality of a sensor to be more accurately determined using the dynamic aspect.

Referring to FIG. 1, an apparatus for individual sensor signal verification includes an information compressor 100 configured to compress output information of individual sensors, a dynamic information reliability meter 200 configured to derive a value that is expected to form compressed data of a current point in time from compressed data of a previous point in time using a dynamic aspect that is modeled through training data, an individual input reliability meter 300 configured to calculate a reliability of a sensor output at a specific point of time in view of normality and abnormality, and a final reliability meter 400 configured to calculate a final reliability using a linear regression analyzer on the basis of reliability weights for a reconstructed data distribution and a compressed data distribution.

The individual input reliability meter 300, that is, a reliability meter for individual input signals, is a module that calculates a reliability of a sensor output $X_t$ at a specific point of time t in view of normality/abnormality.

First, compressed data $Z_t$ is obtained by applying the sensor output $X_t$ to the VAE, a reconstructed data $\hat{X}_t$ of the input is obtained from $Z_t$, and for the compressed data $Z_t$, the extent of how close the compressed data $Z_t$ is to pieces of compressed data having been extracted from training data in a compression space is measured.

For the reconstructed data $\hat{X}_t$, a value $\|\hat{X}_t-X_t\|$ is measured and the value $\|\hat{X}_t-X_t\|$ is reflected on the reliability calculation.

The VAE is characterized in distributing compressed data extracted from training data to have zero-mean, thus when the compressed data $Z_t$ has a larger absolute value, it is considered that the compressed data $Z_t$ is further away from the training data.

Accordingly a final reliability may be calculated as follows.

$$c_s(t) = \lambda_r \times \|\hat{X}_t - X_t\|_2 + \lambda_z \times |Z_t|_1 \quad \text{[Equation 1]}$$

$\lambda_r$ and $\lambda_z$ denote a reliability weight on a distribution of reconstructed data and a reliability weight on a distribution of compressed data, respectively.

The dynamic information reliability meter 200 derives a value $\hat{Z}_t$ that is expected to form compressed data of a current point in time from compressed data $Z_{t-1}$ of a previous point in time using a dynamic aspect that is modeled through training data.

Since the dynamic aspect is a prediction reflecting an operation of a normal sensor in view of the training data, when an actual sensor value shows an aspect different from the dynamic aspect, it is considered a sign of an abnormality.

Accordingly, a dynamic information reliability $c_d(t)$ may be obtained as follows.

$$c_d(t) = \|\hat{X}_t - Z_t\|_2 \quad \text{[Equation 2]}$$

A final reliability $c(t)$ is calculated using a linear regression analyzer having $c_s(t)$ and $c_d(t)$ as inputs.

Collecting multi-modal data will be described as follows.

In order to implement a network for multi-modal, pieces of data simultaneously acquired using different types of sensors for the same environment are required.

According to an embodiment of the present invention, a target network may be implemented using data in the field of advanced driving assistance systems (ADAS), which is a representative application of multimodal, for ease in obtaining mass data and utilization of results.

With regard to the type of sensor data, RGB color images and Lidar sensor data may be used, and effective shared representation may be extracted from two or more types of sensor data.

Multi-modal deep auto-encoder (MMDAE) is described as follows.

MMDAE, a type of deep-learning algorithm, is a deep-learning network specialized in learning a correlation existing between multi-modalities from a large number of data and extracting shared representation shared among modalities from multi-modal inputs.

In addition, on the basis of the shared representation, MMDAE provides high performance in predicting a missing input of a specific modality using input information of other modalities, and thus is suitable for a technology for detecting and compensating for an abnormal operation of a sensor.

Figure 2:
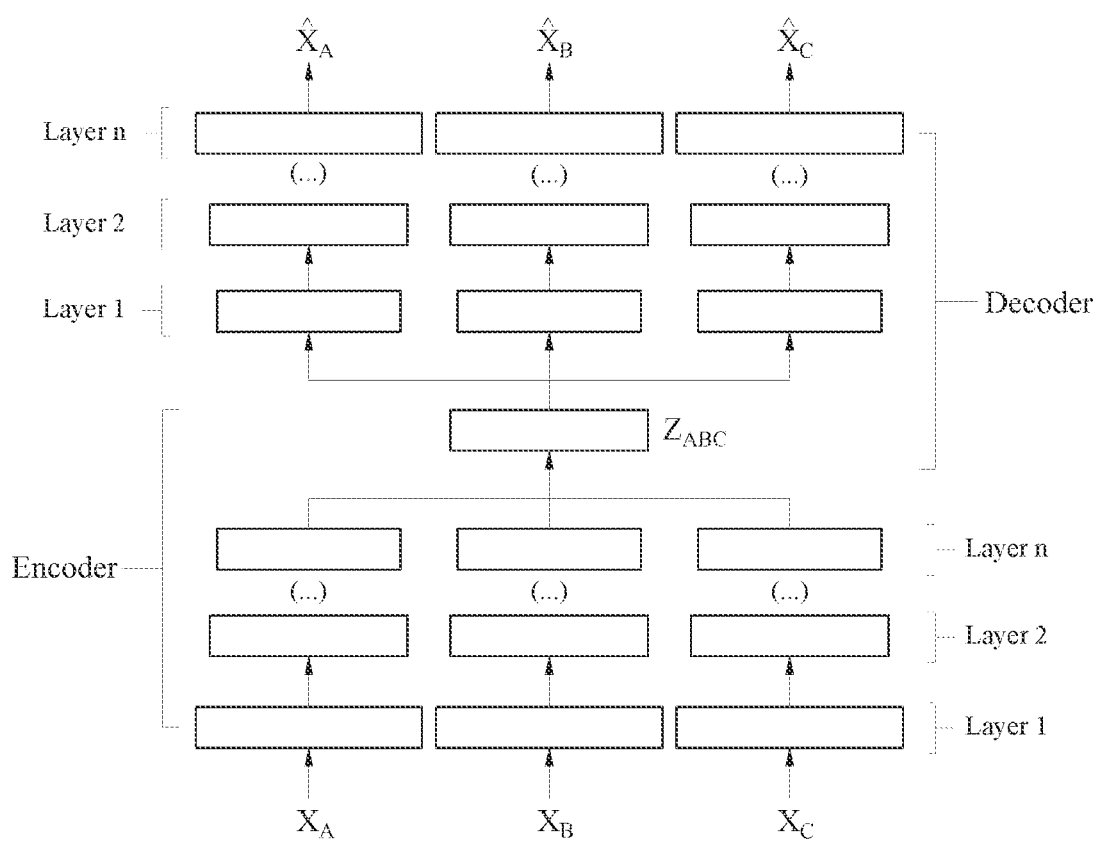
FIG. 2 is a block diagram illustrating an example of a multi-modal deep auto encoder.

FIG. 2 is a block diagram illustrating an example of the MMDAE.

FIG. 2 shows a MMDAE that extracts shared representation from three types of modal data.

The MMDAE has a structure including: an encoder for performing independent abstraction processes on the respective pieces of input data $X_A$, $X_B$, and $X_C$ of the modalities, and extracting shared representation $Z_{ABC}$ from the pieces of input data $X_A$, $X_B$, and $X_C$ subjected to the independent abstraction processes, and a decoder for generating reconstructions $\hat{X}_A$, $\hat{X}_B$, and $\hat{X}_C$ for the pieces of input data through the extracted shared representation.

The structure is an expansion of a basic structure of an auto encoder, which performs low loss and high compression from input data, to be suitable for multi-modalities such that a complex correlation between modalities is automatically trained through a large quantify of training data, providing a characteristic suitable for detecting an abnormal operation of multi-modal sensors.

Figure 3:
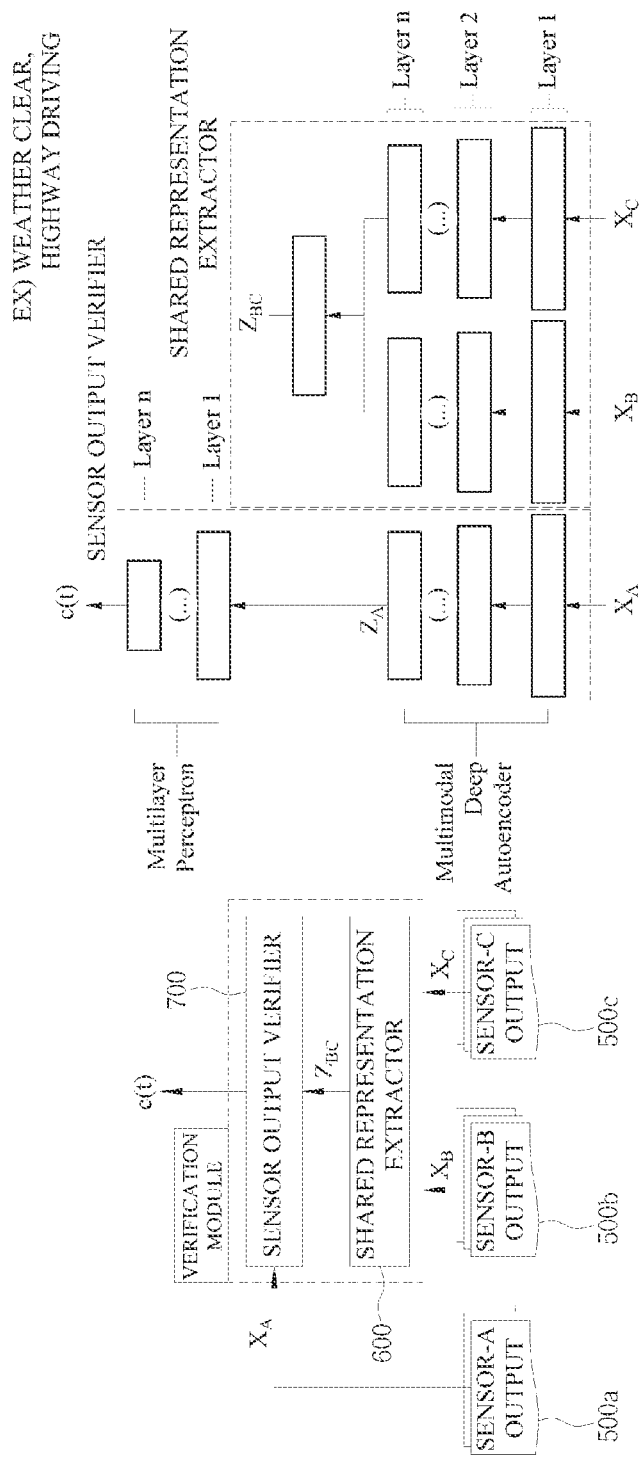
FIG. 3 is a block diagram illustrating an apparatus for mutual verification between multi-type sensors using multi-modality according to the present invention.

FIG. 3 is a block diagram illustrating an apparatus for mutual verification between multi-type sensors using multi-modality according to the present invention.

The apparatus for mutual verification between multi-type sensors using multi-modality according to the present invention includes: a shared representation extractor 600 that extracts shared representation between a sensor-B output 500*b* and a sensor-C output 500*c* to verify a sensor-A output 500*a*; and a sensor output verifier 700 that verifies the sensor-A output 500*a* using the shared representation extracted by the shared representation extractor 600.

The MMDAE is trained to optimize the following objective function L on the basis of N pieces of training data $\{(X_{A_i}, X_{B_i}, X_{C_i}|i=1, \ldots, N\}$.

$$L(X_{A_i}, X_{B_i}, X_{C_i}; \theta) = \operatorname{argmin}_\theta \sum_{k \in A,B,C} \|D(E(X_{k_i}; \theta); \theta) - X_{k_i}\|_2 \quad \text{[Equation 3]}$$

Here, $\theta$ denotes a parameter of a network, and $\mathcal{L}$ and E denote an output of a decoder and an output of an encoder, respectively.

In FIGS. 2 and 3, the arrows between the layers represent a direction of feed forward or an arbitrary connection between layers.

Mutual verification between multiple sensors using a MMDAE is achieved as follows.

When shared representation is included in multi-modal data, the MMDAE may stably extract the shared representation according to a training method even when an input of a specific modality is missing. In addition, the MMDAE may predict the input of the modality, for which the input is missing, on the basis of the extracted shared representation.

By using the characteristics of the MMDAE, the present invention estimates a reliability of an operation of a specific sensor on the basis of inputs of other modal sensors.

The construction for mutual diagnosis between multi-type sensors is as follows.

An abnormality of an operation of a verification target sensor is determined using sensor inputs of other modalities.

Figure 4:
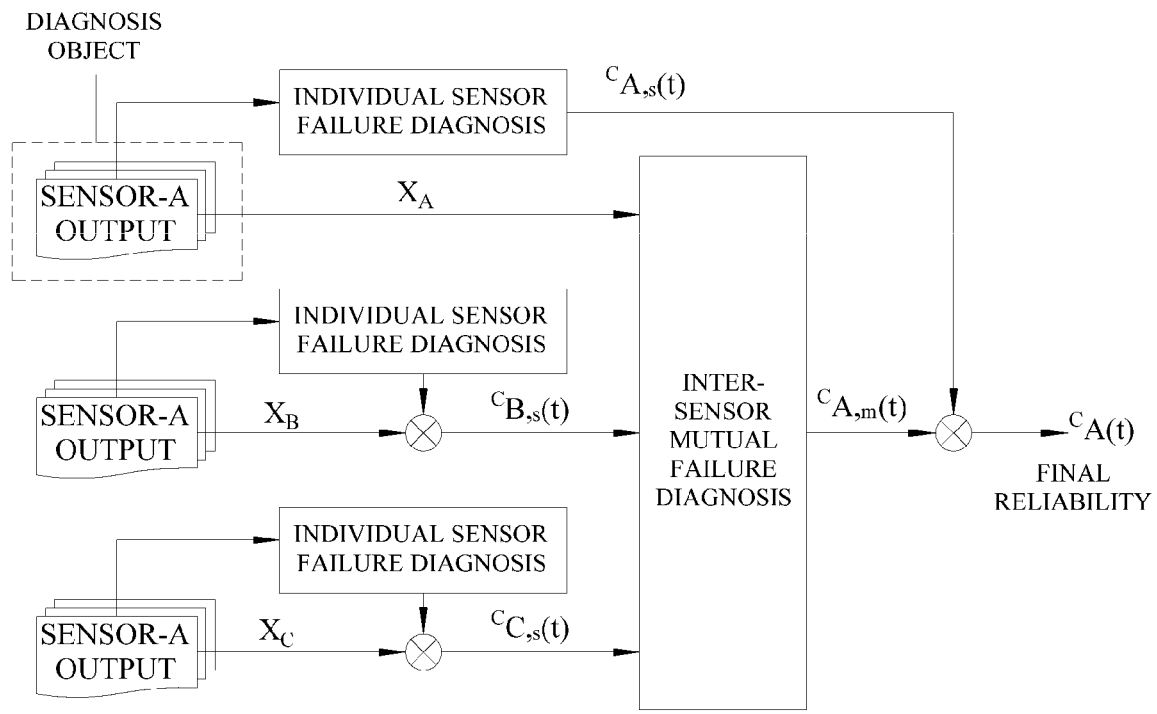
FIG. 4 is a block diagram illustrating an integrated sensor verification apparatus.

FIG. 4 is a block diagram illustrating an integrated sensor verification apparatus.

When a sensor desired to be verified is A and sensors used for the verification are B and C, shared representation $Z_{BC}$ is extracted from the sensors B and C using the MMDAE, and a result $Z_A$ of compressing data of the sensor A, that is, a verification target, is input to a multi-layer perceptron.

The multi-layer perceptron is trained from data of sensors that performs normal operation, and serves to estimate an operation reliability c(t) of an input inputted for a test on the basis of the extent to which the input is different from data used for the training.

In the integrated sensor verification process based on the individual sensor diagnosis result and the mutual diagnosis result, it is assumed that all sensors except for the verification target sensor perform normal operation.

However, since it may not be possible to predict which sensor will operate abnormally when an actual system operates, the possibility of each sensor individually failing is also to be considered.

The present invention includes a construction for determining operation reliabilities of sensors, which serve to assist in verification of an inter-sensor mutual failure diagnosis algorithm, using the individual sensor diagnosis algorithm, and on the basis of the determined reliability, adjusting the influence of a relevant sensor in a process of estimating an operation reliability of a sensor to be verified.

Referring to FIG. 4, an individual sensor failure diagnosis algorithm is applied to the output of each sensor, and the final reliability is calculated by adjusting the weight of a mutual diagnosis result on the basis of a result of the individual sensor failure diagnosis.

A signal reconstruction of an abnormal sensor using learned shared representation is performed as follows.

Figure 5:
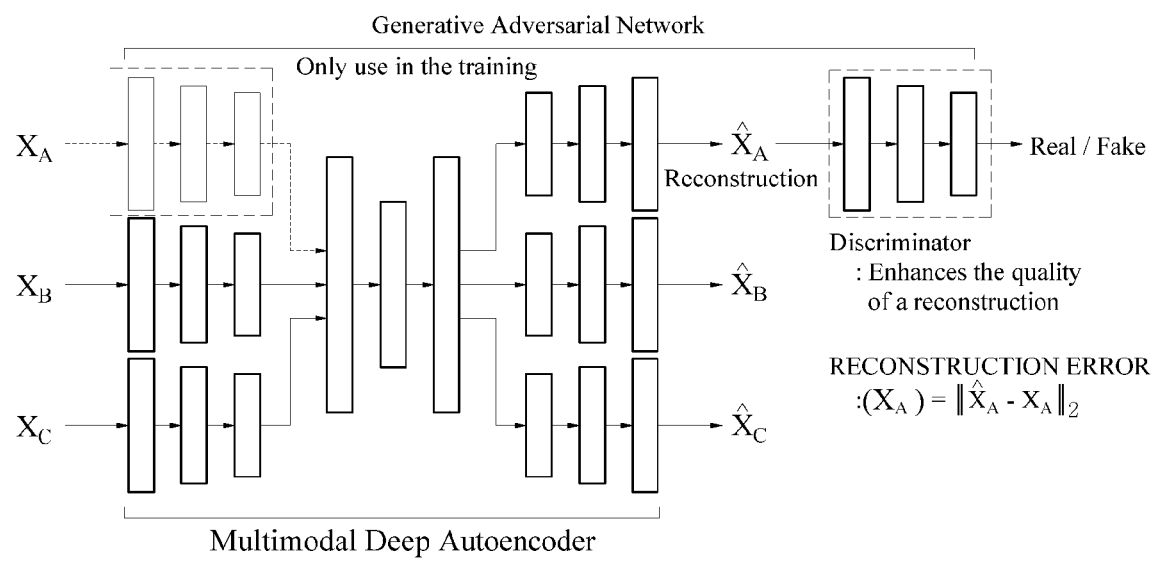
FIG. 5 is a block diagram illustrating an outline of a sensor output reconstruction algorithm.

FIG. 5 is a block diagram illustrating an outline of a sensor output reconstruction algorithm.

In a multi-modal system, it is important to properly perform a target function of the system while it is required to compensate for an abnormal operation of a sensor because a sensor fault of a specific modal is fatal to the stability of the overall system.

A generative adversarial network (GAN) is a deep learning model designed to generate new data that is fairly similar to data actually acquired from a target domain, but did not exit.

The GAN includes a generator network G for generating new virtual data and a discriminator network $\mathcal{L}$ for distinguishing the generated data from actual data, and performs learning on the basis of a competitive relationship in which the two networks derives results that are complementary to each other.

When pieces of actually acquired data follow a probability distribution $P_{data}$, and virtual data generated by the generator network G using low dimensional noise z sampled from a probability distribution $P_z$ as an input is G(z), the GAN optimizes the following objective function:

$$\min_{G} \max_{D} V(D, G) = \qquad \text{[Equation 4]}$$
$$E_{x \sim P_{data}(x)}[\log D(x)] + E_{z \sim P_z(z)}[\log(1 - D(G(z)))]$$

That is, the generator network G is trained such that data generated by the generator network G is determined to be actual data by the discriminator network $\mathcal{L}$, and the discriminator network $\mathcal{L}$ is trained such that data generated by the generator network G is filtered from the actual data.

The trainings are performed in a complementary manner, reaching a state in which both of the networks do not improve the result of the total object function at a certain point in time, which is referred to as Nash equilibrium.

The apparatus and method for processing multi-type sensor signals on the basis of multi-modal deep learning according to the present invention generates virtual data for an output value of a normal-operation sensor on the basis of the above-described characteristics of the GAN, not using a random low dimensional value but using shared representation extracted from other modal sensors, such that even when an output value of a specific sensor is missing, the output value of the sensor is predicted using other sensor information.

Referring to FIG. 5, first, shared representation is extracted using output values of sensors except for a reconstruction target sensor, and expected output values of all sensors are generated using the shared representation.

The output value of the reconstruction target sensor generated as such corresponds to virtual data generated by the generator network in the GAN.

In order to allow the generated output reconstruction value to be derived similarly to actual data, the present invention additionally introduces a discriminator network in the learning process such that an output value for a specific sensor is accurately predicted.

The apparatus and method for processing multi-type sensor signals according to the present invention described above diagnose a failure of an individual sensor of a specific single modality by detecting a sensor abnormality through an algorithm using deep learning, and in the case of multi-modal sensors, design a deep learning network for extracting shared representation between sensors using multi-modality.

In particular, the apparatus and method for processing multi-type sensor signals according to the present invention estimate the reliability of an operation of a specific sensor on the basis of inputs of other modal sensors using a multi-modal deep layer auto encoder, and reconstruct a normal output of an abnormal operation sensor on the basis of extracted shared representation.

As is apparent from the above, the apparatus and method for processing multi-type sensor signals have the follow effects.

First, the apparatus and method for processing multi-type sensor signals can diagnose a failure of an individual sensor of a specific single modality by detecting a sensor abnormality through an algorithm using deep learning.

Second, the apparatus and method for processing multi-type sensor signals can, in the case of multi-modal sensors, design a deep learning network capable of extracting shared representation between sensors using multi-modality.

Third, the apparatus and method for processing multi-type sensor signals can estimate the reliability of an operation of a specific sensor on the basis of inputs of other modal sensors using a multi-modal deep layer auto encoder and reconstruct a normal output of an abnormal operation sensor on the basis of extracted shared representation.

Fourth, the apparatus and method for processing multi-type sensor signals can enhance the efficiency in detecting an abnormal operation of multi-modal sensors by allowing a complex correlation between modalities to be automatically trained through a large quantity of training data using pieces of data simultaneously acquired with respect to the same environment using different types of sensors.

Fifth, the apparatus and method for processing multi-type sensor signals can enable a detection object to be analyzed in a stereoscopic and accurate manner through analysis of multi-modal data, and shared representation between pieces of single modal data extracted through learning can not only enable sensor verification but also provide various uses, such as object recognition, abnormal signal reconstruction, erroneous operation prevention, and the like.

Sixth, the apparatus and method for processing multi-type sensor signals can improve the technical feasibility in extracting shared representation existing between multi inputs through learning of a large amount of data using a multi-modal deep auto encoder, and detecting a missing or corrupted input value on the basis of the shared representation.

Seventh, the apparatus and method for processing multi-type sensor signals can provide high performance in inferring an alternative value to a damaged input value and come into use for various forms of sensor-related systems.

Those skilled in the art should appreciate that various modifications, changes, and substitutions thereto are possible without departing from the scope and spirit of the invention as described above.

Therefore, the exemplary embodiments disclosed in the present invention and the accompanying drawings are intended to illustrate and not limit the technical spirit of the present invention. The scope of the invention is set forth in the following claims rather than the above specification, and it is intended that the present invention covers all modifications provided they come within the scope of the appended claims and their equivalents.

What is claimed is:

1. An apparatus for processing multi-type sensor signals on the basis of multi-modal deep learning, the apparatus comprising:
   an individual sensor failure diagnosis unit configured to measure a normality of a sensor output of a single modal sensor at each sampling period, and sense an abnormal operation of the sensor on the basis of the measured normality;
   an inter-sensor mutual failure diagnosis unit including a multi-modal deep auto encoder, and configured to learn a correlation existing between multi-modalities, extract shared representation between modalities from multi-modal inputs on the basis of the learned correlation, and perform an inter-sensor mutual failure diagnosis; and
   a reconstruction target sensor output value reconstructing unit configured to, when an output value of a specific sensor is missing, predict and reconstruct the output value of the sensor using other sensor information using the shared representation extracted from other modal sensors,
   wherein the individual sensor failure diagnosis unit comprises:
   an information compressor configured to compress output information of individual sensors;
   a dynamic information reliability meter configured to derive a value that is expected to form compressed data of a current point in time from compressed data of a previous point in time using a dynamic aspect that is modeled through training data;
   an individual input reliability meter configured to calculate a reliability of a sensor output at a specified point in time in view of normality and abnormality; and
   a final reliability meter configured to calculate a final reliability using a linear regression analyzer on the basis of reliability weights for a reconstructed data distribution and a compressed data distribution.

2. The apparatus of claim 1, wherein the individual input reliability meter is configured to, in order to calculate reliability of a sensor output $X_t$ at a specified point of time t in view of normality and abnormality:
   obtain compressed data $Z_t$ by applying $X_t$ to a variational auto-encoder (VAE);
   obtain reconstructed data $\hat{X}_t$ of the input from the compressed data $Z_t$;
   measure an extent of how close the compressed data $Z_t$ is to pieces of compressed data extracted from the training data in a compression space;
   measure a value $\hat{X}_t \|\hat{X}_t - X_t\|$; and
   calculate the reliability of the sensor output $X_t$ at the specified point of time t on the basis of the measured extent and the value $\|\hat{X}_t - X_t\|$.

3. The apparatus of claim 2, wherein the individual input reliability meter calculates individual input reliabilty as $$c_s(t) = \lambda_r \times \|\hat{X}_t - X_t\|_2 + \lambda_z \times |Z_t|_1,$$

wherein $\lambda_r$ and $\lambda_z$ denote a reliability weight on a reconstructed data distribution and a reliability weight on a compressed data distribution, respectively.

4. The apparatus of claim 1, wherein the dynamic information reliability meter derives a value $\hat{Z}_t$ that is expected to form compressed data of a current point in time from compressed data $Z_{t-1}$ of a previous point in time using a dynamic aspect that is modeled through training data, wherein a dynamic information reliability $c_d(t)$ is obtained as $c_d(t) = \|\hat{X}_t - Z_t\|_2$.

5. The apparatus of claim 1, wherein the multi-modal deep auto encoder has a structure in which shared representation is extracted from data of three types of modalities, the structure including:
   an encoder configured to perform independent abstraction processes on pieces of input data $X_A$, $X_B$ and $X_C$ of the respective modalities and extract shared representation from the pieces of input data $X_A$, $X_B$ and $X_C$ subjected to the independent abstraction processes; and
   a decoder configured to generate reconstructions of $\hat{X}_A$, $\hat{X}_B$ and $\hat{X}_C$ for the pieces of input data $X_A$, $X_B$ and $X_C$ through the extracted shared representation.

6. The apparatus of claim 5, wherein for mutual verification between multi-type sensors using multi-modality, the multi-modal deep auto encoder is trained such that an objective function L is optimized on the basis of N pieces of training data $\{(X_{A_i}, X_{B_i}, X_{C_i} | i=1, \ldots, N\}$:

$$L(X_{A_i}, X_{B_i}, X_{C_i}; \theta) = \operatorname{argmin}_\theta \sum_{k \in A,B,C} \|D(E(X_{k_i}; \theta); \theta) - X_{k_i}\|_2,$$

wherein $\theta$ denotes a parameter of a network, and D and E denote an output of the decoder and an output of the encoder, respectively.

7. The apparatus of claim 1, wherein when a sensor desired to be verified is A and sensors used for the verification are B and C,
   shared representation $Z_{BC}$ is extracted from the sensors B and C using the multi-modal deep auto encoder, and a result $Z_A$ of compressing data of the sensor A to be verified is input to a multi-layer perceptron.

8. The apparatus of claim 1, wherein the reconstruction target sensor output value reconstructing unit employs a generative adversarial network (GAN) deep learning model including a generator network G configured to generate new virtual data and a discriminator network D configured to distinguish the generated data from actual data, to perform learning on the basis of a competitive relation in which the generator network G and the discriminator network D derive results that are complementary to each other.

9. A method for processing multi-type sensor signals to perform a sensor failure diagnosis and a reconstruction in a multi-modal sensor network combined with multi-type sensors, the method comprising:

measuring a normality of a sensor output of a single modal sensor at each sampling period, and sensing an abnormal operation of the sensor on the basis of the measured normality;

learning a correlation existing between multi-modalities, extracting shared representation between modalities from multi-modal inputs on the basis of the learned correlation, and performing an inter-sensor mutual failure diagnosis; and when an output value of a specific sensor is missing, predicting and reconstructing the output value of the sensor using other sensor information using the shared representation extracted from other modal sensors, wherein the sensing the abnormal operation of the sensor includes:

compressing output information of individual sensors;

deriving a value that is expected to form compressed data of a current point in time from compressed data of a previous point in time using a dynamic aspect that is modeled through training data;

calculating a reliability of a sensor output at a specified point of time in view of normality and abnormality; and calculating a final reliability using a linear regression analyzer on the basis of reliability weights for a reconstructed data distribution and a compressed data distribution.

10. The method of claim 9, further comprising, in order to reconstruct an output value of a reconstruction target sensor, employing a generative adversarial network (GAN) deep learning model including a generator network G configured to generate new virtual data and a discriminator network D configured to distinguish the generated data from actual data, to perform learning on the basis of a competitive relation in which the generator network G and the discriminator network D derive results that are complementary to each other.

* * * * *